US012750915B2

(12) United States Patent
Hahn et al.

(10) Patent No.: US 12,750,915 B2
(45) Date of Patent: Sep. 29, 2026

(54) COMMUNICATION METHOD BASED ON SL DRX IN SIDELINK COMMUNICATION FOR SUPPORTING RESOURCE ALLOCATION MODE 1

(71) Applicants: HYUNDAI MOTOR COMPANY, Seoul (KR); KIA CORPORATION, Seoul (KR); Wonkwang University Center For Industry-Academy Cooperation, Iksan-si (KR)

(72) Inventors: Gene Back Hahn, Hwaseong-si (KR); Ui Hyun Hong, Hwaseong-si (KR); Hyuk Min Son, Iksan-si (KR)

(73) Assignees: Hyundai Motor Company, Seoul (KR); Kia Corporation, Seoul (KR); Wonkwang University Center for Industry-Academy Cooperation, Iksan-si (KR)

( * ) Notice: Subject to any disclaimer, the term of this patent is extended or adjusted under 35 U.S.C. 154(b) by 417 days.

(21) Appl. No.: 18/224,302

(22) Filed: Jul. 20, 2023

(65) Prior Publication Data

US 2023/0371115 A1 Nov. 16, 2023

Related U.S. Application Data

(63) Continuation-in-part of application No. PCT/KR2022/001657, filed on Jan. 28, 2022.

(30) Foreign Application Priority Data

Feb. 3, 2021 (KR) ........................ 10-2021-0015746
Jan. 28, 2022 (KR) ........................ 10-2022-0013422

(51) Int. Cl.
*H04W 76/28* (2018.01)
*H04W 28/26* (2009.01)
(Continued)

(52) U.S. Cl.
CPC ........... *H04W 76/28* (2018.02); *H04W 28/26* (2013.01); *H04W 72/25* (2023.01); *H04W 92/18* (2013.01)

(58) Field of Classification Search
CPC ..... H04W 76/28; H04W 28/26; H04W 72/25; H04W 92/18; H04W 76/14; H04W 52/02;
(Continued)

(56) References Cited

U.S. PATENT DOCUMENTS 10,708,861 B2 7/2020 Xu et al.
2020/0296668 A1 9/2020 Xu et al.
(Continued)

FOREIGN PATENT DOCUMENTS

CN 111556590 A 8/2020
KR 10-2019-0039101 A 4/2019
WO 2020/256462 A1 12/2020

OTHER PUBLICATIONS

International Search dated May 30, 2022 cited in International Patent Application No. PCT/KR2022/001657 (w/English translation).
(Continued)

*Primary Examiner* — Gary Mu
*Assistant Examiner* — Nancy Sixto
(74) *Attorney, Agent, or Firm* — Morgan Lewis & Bockius LLP

(57) ABSTRACT

An operation method of a first terminal comprises receiving, from a base station, DRX state information indicating a Uu DRX state in a Uu link between the base station and the first terminal and a first SL DRX state in a first SL between the first terminal and a second terminal, performing communication with the base station on the Uu link based on the Uu DRX state indicated by the DRX state information and performing communication with the second terminal on the
(Continued)

first SL based on the first SL DRX state indicated by the DRX state information.

15 Claims, 5 Drawing Sheets

(51) Int. Cl.
*H04W 72/25* (2023.01)
*H04W 92/18* (2009.01)

(58) Field of Classification Search
CPC .. H04W 72/23; H04W 72/231; H04W 72/232
See application file for complete search history.

(56) References Cited

U.S. PATENT DOCUMENTS

| | | | | |
|---|---|---|---|---|
| 2021/0051588 | A1* | 2/2021 | Wu | H04W 56/001 |
| 2021/0251037 | A1* | 8/2021 | Akkarakaran | H04W 76/28 |
| 2022/0015188 | A1* | 1/2022 | Bao | H04W 76/28 |
| 2022/0053340 | A1* | 2/2022 | Ryu | H04W 76/28 |
| 2023/0014303 | A1* | 1/2023 | Di Girolamo | H04W 72/20 |
| 2023/0363048 | A1* | 11/2023 | Park | H04W 28/0268 |
| 2024/0349397 | A1* | 10/2024 | Wu | H04W 76/28 |

OTHER PUBLICATIONS

"Alignment of Uu and SL DRX active time," 3GPP TSG RAN WG2 Meeting #113-e Electronic Meeting, Jan. 25 through Feb. 5, 2021.
"Consideration on the sidelink DRX for unicast," 3GPP TSG-RAN WG2 Meeting #113-e On-line, Jan. 25 through Feb. 5, 2021.
Intel Corporation, "Alignment of Uu and SL DRX active time," 3GPP TSG RAN WG2 Meeting #113-e, Electronic meeting, Jan. 25 through Feb. 5, 2021.
Huawei, et al., "Consideration on the sidelink DRX for unicast," 3GPP TSG-RAN WG2 Meeting #113-e, On-line, Jan. 25 through Feb. 5, 2021.

* cited by examiner

COMMUNICATION METHOD BASED ON SL DRX IN SIDELINK COMMUNICATION FOR SUPPORTING RESOURCE ALLOCATION MODE 1

TECHNICAL FIELD

The present disclosure relates to a sidelink communication technique, and more particularly, to a technique for communication based on sidelink discontinuous reception (SL DRX).

BACKGROUND ART

A fifth-generation (5G) communication system (e.g., New Radio (NR) communication system) which uses a frequency band higher than a frequency band of a fourth-generation (4G) communication system (e.g., Long Term Evolution (LTE) communication system or LTE-Advanced (LTE-A) communication system) as well as the frequency band of the 4G communication system has been considered for processing of wireless data. The 5G communication system can support Enhanced Mobile Broadband (eMBB) communications, Ultra-Reliable and Low-Latency communications (URLLC), massive Machine Type Communications (mMTC), and the like.

The 4G communication system and 5G communication system can support Vehicle-to-Everything (V2X) communications. The V2X communications supported in a cellular communication system, such as the 4G communication system, the 5G communication system, and the like, may be referred to as "Cellular-V2X (C-V2X) communications." The V2X communications (e.g., C-V2X communications) may include Vehicle-to-Vehicle (V2V) communications, Vehicle-to-Infrastructure (V2I) communications, Vehicle-to-Pedestrian (V2P) communication, Vehicle-to-Network (V2N) communication, and the like.

In the cellular communication systems, the V2X communications (e.g., C-V2X communications) may be performed based on sidelink communication technologies (e.g., Proximity-based Services (ProSe) communication technology, Device-to-Device (D2D) communication technology, or the like). For example, sidelink channels for vehicles participating in V2V communications can be established, and communications between the vehicles can be performed using the sidelink channels. Sidelink communication may be performed using configured grant (CG) resources. The CG resources may be periodically configured, and periodic data (e.g., periodic sidelink data) may be transmitted using the CG resources.

Meanwhile, resource allocation schemes in sidelink communication may be classified into a mode 1 and a mode 2. When the mode 1 is used, a base station may transmit configuration information (e.g., resource allocation information) for sidelink (SL) communication to a transmitting terminal through a Uu link. The transmitting terminal may receive the configuration information for SL communication from the base station. When the transmitting terminal operates in an idle mode on the Uu link between the base station and the transmitting terminal, this may affect a procedure for transmitting and receiving the configuration information for SL communication. Therefore, methods for efficiently operating a discontinuous reception (DRX) operation on the Uu link and a DRX operation on a sidelink are required. In addition, effective DRX-based communication methods and methods for reducing power consumption are required in a communication environment in which one Uu link and a plurality of sidelinks exist.

SUMMARY

The present disclosure is directed to providing a method and an apparatus for sidelink discontinuous reception (SL DRX) based communication.

An operation method of a first terminal, according to a first exemplary embodiment of the present disclosure for achieving the above-described objective, may comprise: receiving, from a base station, discontinuous reception (DRX) state information indicating a Uu DRX state on a Uu link between the base station and the first terminal and a first sidelink (SL) DRX state on a first SL between the first terminal and a second terminal; performing communication with the base station on the Uu link based on the Uu DRX state indicated by the DRX state information; and performing communication with the second terminal on the first SL based on the first SL DRX state indicated by the DRX state information, wherein the Uu DRX state indicates whether a Uu DRX operation is performed, and the first SL DRX state indicates whether a first SL DRX operation is performed.

The DRX state information may further indicate a second SL DRX state indicating whether a second SL DRX operation is performed on a second SL between the first terminal and a third terminal, and communication between the first terminal and the third terminal may be performed based on the second SL DRX state.

A length of a Uu DRX cycle associated with the Uu DRX operation on the Uu link may be set based on the first SL DRX state.

When the first SL DRX state indicates that the first SL DRX operation is not performed, the Uu DRX cycle having a first length may be set, and when the first SL DRX state indicates that the first SL DRX operation is performed, the Uu DRX cycle having a second length may be set, the first length being shorter than the second length.

The performing of the communication with the second terminal may comprise: determining a number of SL resources reserved by one sidelink control information (SCI) based on a type of a Uu DRX cycle associated with the Uu DRX operation and the first SL DRX state; and performing communication with the second terminal using the SL resources reserved by the one SCI.

When the type of the Uu DRX cycle is a long cycle and the first SL DRX state indicates that the first SL DRX operation is not performed, the number of SL resources may be determined to be a preset maximum number, and when the type of the Uu DRX cycle is the long cycle and the first SL DRX state indicates that the first SL DRX operation is performed, the number of SL resources may be determined to be less than the preset maximum number.

When the type of the Uu DRX cycle is a short cycle and the first SL DRX state indicates that the first SL DRX operation is performed, the number of SL resources may be determined to be smaller than a number of the SL resources determined when the type of the Uu DRX cycle is the short cycle and the first SL DRX state indicates that the first SL DRX operation is not performed.

The operation method may further comprise: receiving, from the base station, a DRX state table defining combinations of a plurality of Uu DRX states and a plurality of first SL DRX states, wherein the DRX state information may indicate one combination among the combinations.

The operation method may further comprise: transmitting the DRX state table to the second terminal; and transmitting the DRX state information indicating the one combination among the combinations defined in the DRX state table to the second terminal.

The operation method may further comprise: receiving, from the base station, information of an effective period in which the DRX state information is used, wherein communication based on the DRX state information may be performed within the effective period.

A first terminal according to a second exemplary embodiment of the present disclosure for achieving the above-described objective, may comprise: a processor; and a memory storing instructions executable by the processor, wherein the instructions are executed to perform: receiving, from a base station, discontinuous reception (DRX) state information indicating a Uu DRX state on a Uu link between the base station and the first terminal and a first sidelink (SL) DRX state on a first SL between the first terminal and a second terminal; performing communication with the base station on the Uu link based on the Uu DRX state indicated by the DRX state information; and performing communication with the second terminal on the first SL based on the first SL DRX state indicated by the DRX state information, wherein the Uu DRX state indicates whether a Uu DRX operation is performed, and the first SL DRX state indicates whether a first SL DRX operation is performed.

The DRX state information may further indicate a second SL DRX state indicating whether a second SL DRX operation is performed on a second SL between the first terminal and a third terminal, and communication between the first terminal and the third terminal may be performed based on the second SL DRX state.

A length of a Uu DRX cycle associated with the Uu DRX operation on the Uu link may be set differently according to whether the first SL DRX operation is performed.

When the first SL DRX state indicates that the first SL DRX operation is not performed, the Uu DRX cycle having a first length may be set, and when the first SL DRX state indicates that the first SL DRX operation is performed, the Uu DRX cycle having a second length may be set, the first length being shorter than the second length.

The performing of the communication with the second terminal comprises: determining a number of SL resources reserved by one sidelink control information (SCI) based on a type of a Uu DRX cycle associated with the Uu DRX operation and the first SL DRX state; and performing communication with the second terminal using the SL resources reserved by the one SCI.

When the type of the Uu DRX cycle is a long cycle and the first SL DRX state indicates that the first SL DRX operation is not performed, the number of SL resources may be determined to be a preset maximum number; when the type of the Uu DRX cycle is the long cycle and the first SL DRX state indicates that the first SL DRX operation is performed, the number of SL resources may be determined to be less than the preset maximum number; and when the type of the Uu DRX cycle is a short cycle and the first SL DRX state indicates that the first SL DRX operation is performed, the number of SL resources may be determined to be smaller than a number of the SL resources determined when the type of the Uu DRX cycle is a short cycle and the first SL DRX state indicates that the first SL DRX operation is not performed.

The instructions may be further executed to perform: receiving, from the base station, a DRX state table defining combinations of a plurality of Uu DRX states and a plurality of first SL DRX states, wherein the DRX state information may indicate one combination among the combinations.

According to the present disclosure, a first terminal may perform communication with a base station on a Uu link and may perform communication with a second terminal on a SL. Communication in the Uu link may be performed based on a Uu DRX operation, and communication in the SL may be performed based on a SL DRX operation. Uu DRX configuration information (e.g., Uu DRX cycle) may be configured according to whether a SL DRX operation is performed, and configuration information (e.g., the number of SL resources) for SL communication between the first terminal and the second terminal may be configured according to whether the Uu DRX operation and/or the SL DRX operation is performed. Accordingly, the DRX operations in the communication system can be efficiently performed, and the performance of the communication system can be improved.

DETAILED DESCRIPTION

Figure 1:
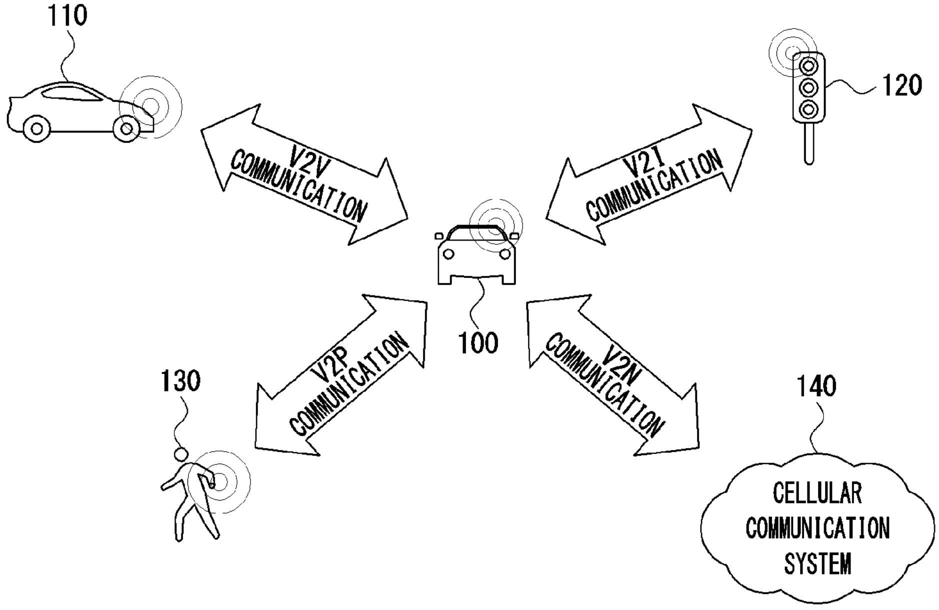
FIG. 1 is a conceptual diagram illustrating V2X communication scenarios.

Since the present disclosure may be variously modified and have several forms, specific exemplary embodiments will be shown in the accompanying drawings and be described in detail in the detailed description. It should be understood, however, that it is not intended to limit the present disclosure to the specific exemplary embodiments but, on the contrary, the present disclosure is to cover all modifications and alternatives falling within the spirit and scope of the present disclosure.

Relational terms such as first, second, and the like may be used for describing various elements, but the elements should not be limited by the terms. These terms are only used to distinguish one element from another. For example, a first component may be named a second component without departing from the scope of the present disclosure, and the second component may also be similarly named the first component. The term "and/or" means any one or a combination of a plurality of related and described items.

In exemplary embodiments of the present disclosure, "at least one of A and B" may refer to "at least one of A or B" or "at least one of combinations of one or more of A and B".

In addition, "one or more of A and B" may refer to "one or more of A or B" or "one or more of combinations of one or more of A and B".

In exemplary embodiments of the present disclosure, '(re)transmission' may refer to 'transmission', 'retransmission', or 'transmission and retransmission', '(re)configuration' may refer to 'configuration', 'reconfiguration', or 'configuration and reconfiguration', '(re)connection' may refer to 'connection', 'reconnection', or 'connection and reconnection', and '(re)access' may refer to 'access', 're-access', or 'access and re-access'.

When it is mentioned that a certain component is "coupled with" or "connected with" another component, it should be understood that the certain component is directly "coupled with" or "connected with" to the other component or a further component may be disposed therebetween. In contrast, when it is mentioned that a certain component is "directly coupled with" or "directly connected with" another component, it will be understood that a further component is not disposed therebetween.

The terms used in the present disclosure are only used to describe specific exemplary embodiments, and are not intended to limit the present disclosure. The singular expression includes the plural expression unless the context clearly dictates otherwise. In the present disclosure, terms such as 'comprise' or 'have' are intended to designate that a feature, number, step, operation, component, part, or combination thereof described in the specification exists, but it should be understood that the terms do not preclude existence or addition of one or more features, numbers, steps, operations, components, parts, or combinations thereof.

Unless otherwise defined, all terms (including technical and scientific terms) used herein have the same meaning as commonly understood by one of ordinary skill in the art to which this disclosure belongs. Terms that are generally used and have been in dictionaries should be construed as having meanings matched with contextual meanings in the art. In this description, unless defined clearly, terms are not necessarily construed as having formal meanings.

Hereinafter, forms of the present disclosure will be described in detail with reference to the accompanying drawings. In describing the disclosure, to facilitate the entire understanding of the disclosure, like numbers refer to like elements throughout the description of the figures and the repetitive description thereof will be omitted.

FIG. 1 is a conceptual diagram illustrating V2X communication scenarios.

As shown in FIG. 1, the V2X communications may include Vehicle-to-Vehicle (V2V) communications, Vehicle-to-Infrastructure (V2I) communications, Vehicle-to-Pedestrian (V2P) communications, Vehicle-to-Network (V2N) communications, and the like. The V2X communications may be supported by a cellular communication system (e.g., a cellular communication system 140), and the V2X communications supported by the cellular communication system 140 may be referred to as "Cellular-V2X (C-V2X) communications." Here, the cellular communication system 140 may include the 4G communication system (e.g., LTE communication system or LTE-A communication system), the 5G communication system (e.g., NR communication system), and the like.

The V2V communications may include communications between a first vehicle 100 (e.g., a communication node located in the vehicle 100) and a second vehicle 110 (e.g., a communication node located in the vehicle 110). Various driving information such as velocity, heading, time, position, and the like may be exchanged between the vehicles 100 and 110 through the V2V communications. For example, autonomous driving (e.g., platooning) may be supported based on the driving information exchanged through the V2V communications. The V2V communications supported in the cellular communication system 140 may be performed based on "sidelink" communication technologies (e.g., ProSe and D2D communication technologies, and the like). In this case, the communications between the vehicles 100 and 110 may be performed using at least one sidelink channel established between the vehicles 100 and 110.

The V2I communications may include communications between the first vehicle 100 (e.g., the communication node located in the vehicle 100) and an infrastructure (e.g., road side unit (RSU)) 120 located on a roadside. The infrastructure 120 may also include a traffic light or a street light which is located on the roadside. For example, when the V2I communications are performed, the communications may be performed between the communication node located in the first vehicle 100 and a communication node located in a traffic light. Traffic information, driving information, and the like may be exchanged between the first vehicle 100 and the infrastructure 120 through the V2I communications. The V2I communications supported in the cellular communication system 140 may also be performed based on sidelink communication technologies (e.g., ProSe and D2D communication technologies, and the like). In this case, the communications between the vehicle 100 and the infrastructure 120 may be performed using at least one sidelink channel established between the vehicle 100 and the infrastructure 120.

The V2P communications may include communications between the first vehicle 100 (e.g., the communication node located in the vehicle 100) and a person 130 (e.g., a communication node carried by the person 130). The driving information of the first vehicle 100 and movement information of the person 130 such as velocity, heading, time, position, and the like may be exchanged between the vehicle 100 and the person 130 through the V2P communications. The communication node located in the vehicle 100 or the communication node carried by the person 130 may generate an alarm indicating a danger by judging a dangerous situation based on the obtained driving information and movement information. The V2P communications supported in the cellular communication system 140 may be performed based on sidelink communication technologies (e.g., ProSe and D2D communication technologies, and the like). In this case, the communications between the communication node located in the vehicle 100 and the communication node carried by the person 130 may be performed using at least one sidelink channel established between the communication nodes.

The V2N communications may be communications between the first vehicle 100 (e.g., the communication node located in the vehicle 100) and a server connected through the cellular communication system 140. The V2N communications may be performed based on the 4G communication technology (e.g., LTE or LTE-A) or the 5G communication technology (e.g., NR). Also, the V2N communications may be performed based on a Wireless Access in Vehicular Environments (WAVE) communication technology or a Wireless Local Area Network (WLAN) communication technology which is defined in Institute of Electrical and Electronics Engineers (IEEE) 802.11, or a Wireless Personal Area Network (WPAN) communication technology defined in IEEE 802.15.

Meanwhile, the cellular communication system 140 supporting the V2X communications may be configured as follows.

Figure 2:
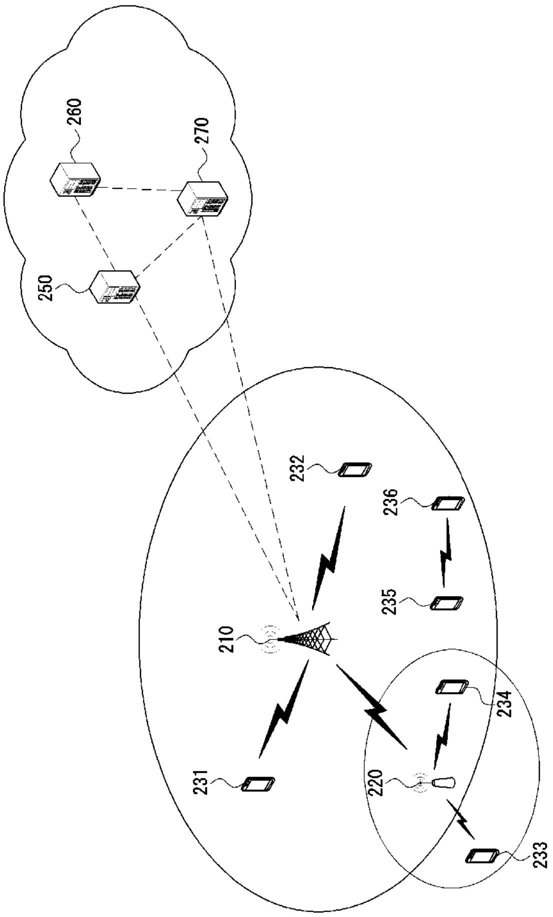
FIG. 2 is a conceptual diagram illustrating an exemplary embodiment of a cellular communication system.

FIG. 2 is a conceptual diagram illustrating an exemplary embodiment of a cellular communication system.

As shown in FIG. 2, a cellular communication system may include an access network, a core network, and the like. The access network may include abase station 210, a relay 220, User Equipments (UEs) 231 through 236, and the like. The UEs 231 through 236 may include communication nodes located in the vehicles 100 and 110 of FIG. 1, the communication node located in the infrastructure 120 of FIG. 1, the communication node carried by the person 130 of FIG. 1, and the like. When the cellular communication system supports the 4G communication technology, the core network may include a serving gateway (S-GW) 250, a packet data network (PDN) gateway (P-GW) 260, a mobility management entity (MME) 270, and the like.

When the cellular communication system supports the 5G communication technology, the core network may include a user plane function (UPF) 250, a session management function (SMF) 260, an access and mobility management function (AMF) 270, and the like. Alternatively, when the cellular communication system operates in a Non-Stand Alone (NSA) mode, the core network constituted by the S-GW 250, the P-GW 260, and the MME 270 may support the 5G communication technology as well as the 4G communication technology, and the core network constituted by the UPF 250, the SMF 260, and the AMF 270 may support the 4G communication technology as well as the 5G communication technology.

In addition, when the cellular communication system supports a network slicing technique, the core network may be divided into a plurality of logical network slices. For example, a network slice supporting V2X communications (e.g., a V2V network slice, a V2I network slice, a V2P network slice, a V2N network slice, etc.) may be configured, and the V2X communications may be supported through the V2X network slice configured in the core network.

The communication nodes (e.g., base station, relay, UE, S-GW, P-GW, MME, UPF, SMF, AMF, etc.) comprising the cellular communication system may perform communications by using at least one communication technology among a code division multiple access (CDMA) technology, a time division multiple access (TDMA) technology, a frequency division multiple access (FDMA) technology, an orthogonal frequency division multiplexing (OFDM) technology, a filtered OFDM technology, an orthogonal frequency division multiple access (OFDMA) technology, a single carrier FDMA (SC-FDMA) technology, a non-orthogonal multiple access (NOMA) technology, a generalized frequency division multiplexing (GFDM) technology, a filter bank multi-carrier (FBMC) technology, a universal filtered multi-carrier (UFMC) technology, and a space division multiple access (SDMA) technology.

The communication nodes (e.g., base station, relay, UE, S-GW, P-GW, MME, UPF, SMF, AMF, etc.) comprising the cellular communication system may be configured as follows.

Figure 3:
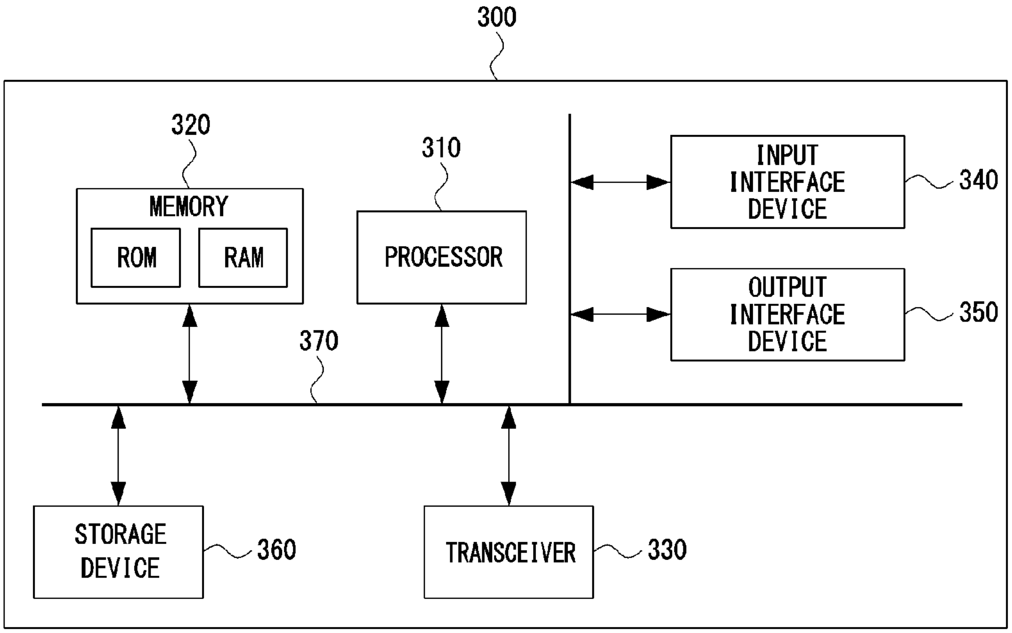
FIG. 3 is a conceptual diagram illustrating an exemplary embodiment of a communication node constituting a cellular communication system.

FIG. 3 is a conceptual diagram illustrating an exemplary embodiment of a communication node constituting a cellular communication system.

As shown in FIG. 3, a communication node 300 may comprise at least one processor 310, a memory 320, and a transceiver 330 connected to a network for performing communications. Also, the communication node 300 may further comprise an input interface device 340, an output interface device 350, a storage device 360, and the like. Each component included in the communication node 300 may communicate with each other as connected through a bus 370.

However, each of the components included in the communication node 300 may be connected to the processor 310 via a separate interface or a separate bus rather than the common bus 370. For example, the processor 310 may be connected to at least one of the memory 320, the transceiver 330, the input interface device 340, the output interface device 350, and the storage device 360 via a dedicated interface.

The processor 310 may execute at least one instruction stored in at least one of the memory 320 and the storage device 360. The processor 310 may refer to a central processing unit (CPU), a graphics processing unit (GPU), or a dedicated processor on which methods in accordance with embodiments of the present disclosure are performed. Each of the memory 320 and the storage device 360 may include at least one of a volatile storage medium and a non-volatile storage medium. For example, the memory 320 may comprise at least one of read-only memory (ROM) and random access memory (RAM).

Referring again to FIG. 2, in the communication system, the base station 210 may form a macro cell or a small cell, and may be connected to the core network via an ideal backhaul or a non-ideal backhaul. The base station 210 may transmit signals received from the core network to the UEs 231 through 236 and the relay 220, and may transmit signals received from the UEs 231 through 236 and the relay 220 to the core network. The UEs 231, 232, 234, 235 and 236 may belong to cell coverage of the base station 210. The UEs 231, 232, 234, 235 and 236 may be connected to the base station 210 by performing a connection establishment procedure with the base station 210. The UEs 231, 232, 234, 235 and 236 may communicate with the base station 210 after being connected to the base station 210.

The relay 220 may be connected to the base station 210 and may relay communications between the base station 210 and the UEs 233 and 234. That is, the relay 220 may transmit signals received from the base station 210 to the UEs 233 and 234, and may transmit signals received from the UEs 233 and 234 to the base station 210. The UE 234 may belong to both of the cell coverage of the base station 210 and the cell coverage of the relay 220, and the UE 233 may belong to the cell coverage of the relay 220. That is, the UE 233 may be located outside the cell coverage of the base station 210. The UEs 233 and 234 may be connected to the relay 220 by performing a connection establishment procedure with the relay 220. The UEs 233 and 234 may communicate with the relay 220 after being connected to the relay 220.

The base station 210 and the relay 220 may support multiple-input, multiple-output (MIMO) technologies (e.g., single user (SU)-MIMO, multi-user (MU)-MIMO, massive MIMO, etc.), coordinated multipoint (CoMP) communication technologies, carrier aggregation (CA) communication technologies, unlicensed band communication technologies (e.g., Licensed Assisted Access (LAA), enhanced LAA (eLAA), etc.), sidelink communication technologies (e.g., ProSe communication technology, D2D communication technology), or the like. The UEs 231, 232, 235 and 236 may perform operations corresponding to the base station 210 and operations supported by the base station 210. The UEs 233 and 234 may perform operations corresponding to the relays 220 and operations supported by the relays 220.

Here, the base station 210 may be referred to as a Node B (NB), an evolved Node B (eNB), a base transceiver station (BTS), a radio remote head (RRH), a transmission reception point (TRP), a radio unit (RU), a roadside unit (RSU), a radio transceiver, an access point, an access node, or the like. The relay 220 may be referred to as a small base station, a relay node, or the like. Each of the UEs 231 through 236 may be referred to as a terminal, an access terminal, a mobile terminal, a station, a subscriber station, a mobile station, a portable subscriber station, a node, a device, an on-broad unit (OBU), or the like.

Meanwhile, the communications between the UEs 235 and 236 may be performed based on the sidelink communication technique. The sidelink communications may be performed based on a one-to-one scheme or a one-to-many scheme. When V2V communications are performed using the sidelink communication technique, the UE 235 may be the communication node located in the first vehicle 100 of FIG. 1 and the UE 236 may be the communication node located in the second vehicle 110 of FIG. 1. When V2I communications are performed using the sidelink communication technique, the UE 235 may be the communication node located in first vehicle 100 of FIG. 1 and the UE 236 may be the communication node located in the infrastructure 120 of FIG. 1. When V2P communications are performed using the sidelink communication technique, the UE 235 may be the communication node located in first vehicle 100 of FIG. 1 and the UE 236 may be the communication node carried by the person 130 of FIG. 1.

The scenarios to which the sidelink communications are applied may be classified as shown below in Table 1 according to the positions of the UEs (e.g., the UEs 235 and 236) participating in the sidelink communications. For example, the scenario for the sidelink communications between the UEs 235 and 236 shown in FIG. 2 may be a sidelink communication scenario C.

TABLE 1

| Sidelink Communication Scenario | Position of UE 235 | Position of UE 236 |
|---|---|---|
| A | Out of coverage of base station 210 | Out of coverage of base station 210 |
| B | In coverage of base station 210 | Out of coverage of base station 210 |
| C | In coverage of base station 210 | In coverage of base station 210 |
| D | In coverage of base station 210 | In coverage of other base station |

Meanwhile, a user plane protocol stack of the UEs (e.g., the UEs 235 and 236) performing sidelink communications may be configured as follows.

Figure 4:
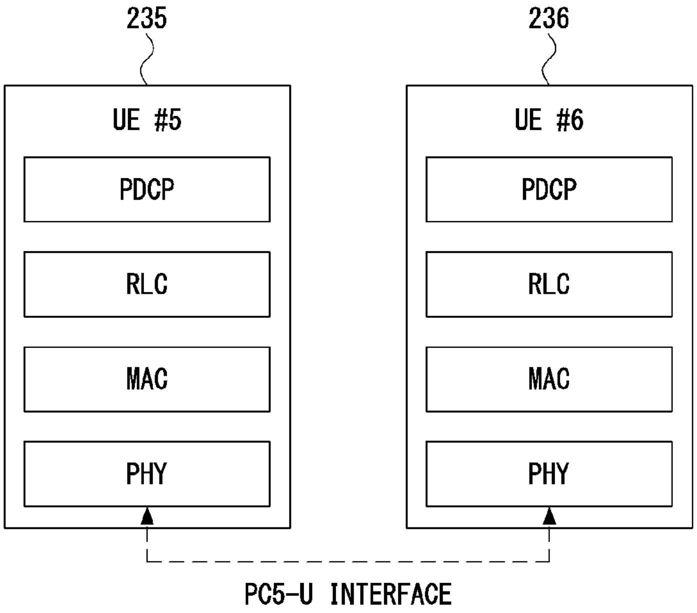
FIG. 4 is a block diagram illustrating an exemplary embodiment of a user plane protocol stack of a UE performing sidelink communication.

FIG. 4 is a block diagram illustrating an exemplary embodiment of a user plane protocol stack of a UE performing sidelink communication.

As shown in FIG. 4, a left UE may be the UE 235 shown in FIG. 2 and a right UE may be the UE 236 shown in FIG. 2. The scenario for the sidelink communications between the UEs 235 and 236 may be one of the sidelink communication scenarios A through D of Table 1. The user plane protocol stack of each of the UEs 235 and 236 may comprise a physical (PHY) layer, a medium access control (MAC) layer, a radio link control (RLC) layer, and a packet data convergence protocol (PDCP) layer.

The sidelink communications between the UEs 235 and 236 may be performed using a PC5 interface (e.g., PC5-U interface). A layer-2 identifier (ID) (e.g., a source layer-2 ID, a destination layer-2 ID) may be used for the sidelink communications, and the layer 2-ID may be an ID configured for the V2X communications (e.g., V2X service). Also, in the sidelink communications, a hybrid automatic repeat request (HARQ) feedback operation may be supported, and an RLC acknowledged mode (RLC AM) or an RLC unacknowledged mode (RLC UM) may be supported.

Meanwhile, a control plane protocol stack of the UEs (e.g., the UEs 235 and 236) performing sidelink communications may be configured as follows.

Figure 5:
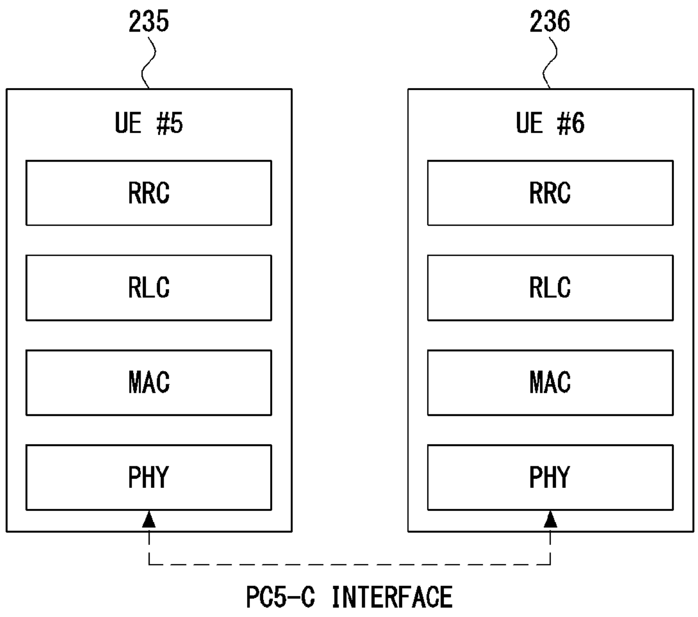
FIG. 5 is a block diagram illustrating a first exemplary embodiment of a control plane protocol stack of a UE performing sidelink communication.
Figure 6:
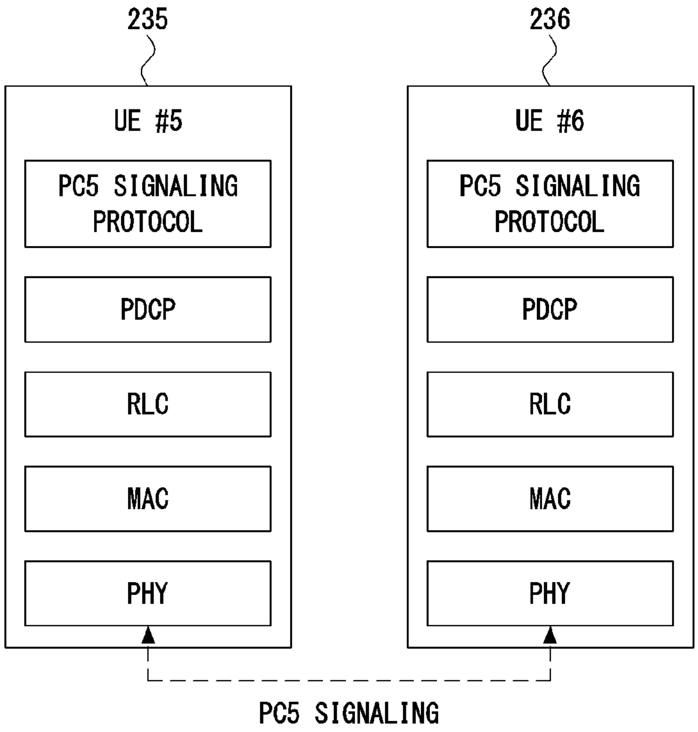
FIG. 6 is a block diagram illustrating a second exemplary embodiment of a control plane protocol stack of a UE performing sidelink communication.

FIG. 5 is a block diagram illustrating a first exemplary embodiment of a control plane protocol stack of a UE performing sidelink communication, and FIG. 6 is a block diagram illustrating a second exemplary embodiment of a control plane protocol stack of a UE performing sidelink communication.

As shown in FIGS. 5 and 6, a left UE may be the UE 235 shown in FIG. 2 and a right UE may be the UE 236 shown in FIG. 2. The scenario for the sidelink communications between the UEs 235 and 236 may be one of the sidelink communication scenarios A through D of Table 1. The control plane protocol stack illustrated in FIG. 5 may be a control plane protocol stack for transmission and reception of broadcast information (e.g., Physical Sidelink Broadcast Channel (PSBCH)).

The control plane protocol stack shown in FIG. 5 may include a PHY layer, a MAC layer, an RLC layer, and a radio resource control (RRC) layer. The sidelink communications between the UEs 235 and 236 may be performed using a PC5 interface (e.g., PC5-C interface). The control plane protocol stack shown in FIG. 6 may be a control plane protocol stack for one-to-one sidelink communication. The control plane protocol stack shown in FIG. 6 may include a PHY layer, a MAC layer, an RLC layer, a PDCP layer, and a PC5 signaling protocol layer.

Meanwhile, channels used in the sidelink communications between the UEs 235 and 236 may include a Physical Sidelink Shared Channel (PSSCH), a Physical Sidelink Control Channel (PSCCH), a Physical Sidelink Discovery Channel (PSDCH), and a Physical Sidelink Broadcast Channel (PSBCH). The PSSCH may be used for transmitting and receiving sidelink data and may be configured in the UE (e.g., UE 235 or 236) by a higher layer signaling. The PSCCH may be used for transmitting and receiving sidelink control information (SCI) and may also be configured in the UE (e.g., UE 235 or 236) by a higher layer signaling.

The PSDCH may be used for a discovery procedure. For example, a discovery signal may be transmitted over the PSDCH. The PSBCH may be used for transmitting and receiving broadcast information (e.g., system information). Also, a demodulation reference signal (DM-RS), a synchronization signal, or the like may be used in the sidelink communications between the UEs 235 and 236. The synchronization signal may include a primary sidelink synchronization signal (PSSS) and a secondary sidelink synchronization signal (SSSS).

Meanwhile, a sidelink transmission mode (TM) may be classified into sidelink TMs 1 to 4 as shown below in Table 2.

TABLE 2

| Sidelink TM | Description |
|---|---|
| 1 | Transmission using resources scheduled by base station |
| 2 | UE autonomous transmission without scheduling of base station |

TABLE 2-continued

| Sidelink TM | Description |
|---|---|
| 3 | Transmission using resources scheduled by base station in V2X communications |
| 4 | UE autonomous transmission without scheduling of base station in V2X communications |

When the sidelink TM 3 or 4 is supported, each of the UEs 235 and 236 may perform sidelink communications using a resource pool configured by the base station 210. The resource pool may be configured for each of the sidelink control information and the sidelink data.

The resource pool for the sidelink control information may be configured based on an RRC signaling procedure (e.g., a dedicated RRC signaling procedure, a broadcast RRC signaling procedure). The resource pool used for reception of the sidelink control information may be configured by a broadcast RRC signaling procedure. When the sidelink TM 3 is supported, the resource pool used for transmission of the sidelink control information may be configured by a dedicated RRC signaling procedure. In this case, the sidelink control information may be transmitted through resources scheduled by the base station 210 within the resource pool configured by the dedicated RRC signaling procedure. When the sidelink TM 4 is supported, the resource pool used for transmission of the sidelink control information may be configured by a dedicated RRC signaling procedure or a broadcast RRC signaling procedure. In this case, the sidelink control information may be transmitted through resources selected autonomously by the UE (e.g., UE 235 or 236) within the resource pool configured by the dedicated RRC signaling procedure or the broadcast RRC signaling procedure.

When the sidelink TM 3 is supported, the resource pool for transmitting and receiving sidelink data may not be configured. In this case, the sidelink data may be transmitted and received through resources scheduled by the base station 210. When the sidelink TM 4 is supported, the resource pool for transmitting and receiving sidelink data may be configured by a dedicated RRC signaling procedure or a broadcast RRC signaling procedure. In this case, the sidelink data may be transmitted and received through resources selected autonomously by the UE (e.g., UE 235 or 236) within the resource pool configured by the dedicated RRC signaling procedure or the broadcast RRC signaling procedure.

Hereinafter, sidelink communication methods will be described. Even when a method (e.g., transmission or reception of a signal) to be performed at a first communication node among communication nodes is described, a corresponding second communication node may perform a method (e.g., reception or transmission of the signal) corresponding to the method performed at the first communication node. That is, when an operation of a UE #1 (e.g., vehicle #1) is described, a UE #2 (e.g., vehicle #2) corresponding thereto may perform an operation corresponding to the operation of the UE #1. Conversely, when an operation of the UE #2 is described, the corresponding UE #1 may perform an operation corresponding to the operation of the UE #2. In exemplary embodiments described below, an operation of a vehicle may be an operation of a communication node located in the vehicle.

In exemplary embodiments, signaling may be one or a combination of two or more of higher layer signaling, MAC signaling, and physical (PHY) signaling. A message used for higher layer signaling may be referred to as a 'higher layer message' or 'higher layer signaling message'. A message used for MAC signaling may be referred to as a 'MAC message' or 'MAC signaling message'. A message used for PHY signaling may be referred to as a 'PHY message' or 'PHY signaling message'. The higher layer signaling may refer to an operation of transmitting and receiving system information (e.g., master information block (MIB), system information block (SIB)) and/or an RRC message. The MAC signaling may refer to an operation of transmitting and receiving a MAC control element (CE). The PHY signaling may refer to an operation of transmitting and receiving control information (e.g., downlink control information (DCI), uplink control information (UCI), or SCI).

A sidelink signal may be a synchronization signal and a reference signal used for sidelink communication. For example, the synchronization signal may be a synchronization signal/physical broadcast channel (SS/PBCH) block, sidelink synchronization signal (SLSS), primary sidelink synchronization signal (PSSS), secondary sidelink synchronization signal (SSSS), or the like. The reference signal may be a channel state information-reference signal (CSI-RS), DM-RS, phase tracking-reference signal (PT-RS), cell-specific reference signal (CRS), sounding reference signal (SRS), discovery reference signal (DRS), or the like.

A sidelink channel may be a PSSCH, PSCCH, PSDCH, PSBCH, physical sidelink feedback channel (PSFCH), or the like. In addition, a sidelink channel may refer to a sidelink channel including a sidelink signal mapped to specific resources in the corresponding sidelink channel. The sidelink communication may support a broadcast service, a multicast service, a groupcast service, and a unicast service.

The sidelink communication may be performed based on a single-SCI scheme or a multi-SCI scheme. When the single-SCI scheme is used, data transmission (e.g., sidelink data transmission, sidelink-shared channel (SL-SCH) transmission) may be performed based on one SCI (e.g., 1st-stage SCI). When the multi-SCI scheme is used, data transmission may be performed using two SCIs (e.g., 1st-stage SCI and 2nd-stage SCI). The SCI(s) may be transmitted on a PSCCH and/or a PSSCH. When the single-SCI scheme is used, the SCI (e.g., 1st-stage SCI) may be transmitted on a PSCCH. When the multi-SCI scheme is used, the 1st-stage SCI may be transmitted on a PSCCH, and the 2nd-stage SCI may be transmitted on the PSCCH or a PSSCH. The 1st-stage SCI may be referred to as 'first-stage SCI', and the 2nd-stage SCI may be referred to as 'second-stage SCI'. A format of the first-stage SCI may include a SCI format 1-A, and a format of the second-stage SCI may include a SCI format 2-A and a SCI format 2-B.

The 1st-stage SCI may include or more information elements among priority information, frequency resource assignment information, time resource assignment information, resource reservation period information, demodulation reference signal (DMRS) pattern information, 2nd-stage SCI format information, a beta_offset indicator, the number of DMRS ports, and modulation and coding scheme (MCS) information. The 2nd-stage SCI may include one or more information elements among a HARQ processor identifier (ID), a redundancy version (RV), a source ID, a destination ID, CSI request information, a zone ID, and communication range requirements.

In exemplary embodiments, 'configuring an operation (e.g., DRX operation)' may refer to signaling of 'configuration information (e.g., information elements, parameters) for the operation' and/or 'information instructing to perform the operation'. 'Configuring an information element (e.g., parameter)' may mean that the information element is signaled. The signaling may be at least one of system information (SI) signaling (e.g., transmission of a system information block (SIB) and/or master information block (MIB)), RRC signaling (e.g., transmission of an RRC parameter and/or higher layer parameter), MAC control element (CE) signaling, or PHY signaling (e.g., transmission of downlink control information (DCI), uplink control information (UCI), and/or sidelink control information (SCI)). Here, transmission of SCI may refer to transmission of 1st-stage SCI and/or 2nd-stage SCI.

In exemplary embodiments, a transmitting terminal may refer to a terminal transmitting SL data, and a receiving terminal may refer to a terminal receiving the SL data. The receiving terminal may support SL discontinuous reception (DRX). An operation mode of the receiving terminal supporting SL DRX may transition from a non-communication mode to a communication mode at a specific time, and the receiving terminal operating in the communication mode may perform a channel and/or signal reception operation. The non-communication mode may refer to a mode in which the receiving terminal does not perform communication (e.g., reception operation). For example, the non-communication mode may be an inactive mode, idle mode, or sleep mode. The communication mode may refer to a mode in which the receiving terminal performs communication (e.g., reception operation). For example, the communication mode may be a wake-up mode, connected mode, or active mode.

The receiving terminal may operate according to a DRX cycle. For example, the operation mode of the receiving terminal may be transitioned according to the DRX cycle. The DRX cycle may refer to an interval between times at which the operation mode of the receiving terminal transitions to the wake-up mode. A 'longer DRX cycle' may mean a 'longer time interval' at which the receiving terminal wakes up. When SL DRX is applied from the perspective of the transmitting terminal, the transmitting terminal may wake up for transmission according to the DRX cycle. For example, when there is SL data to be transmitted to the receiving terminal, the transmitting terminal may attempt to transmit the SL data in consideration of the DRX cycle. The receiving terminal may attempt to receive the SL data according to the DRX cycle.

Figure 7:
FIG. 7 is a conceptual diagram illustrating a first exemplary embodiment of a communication system including a Uu link and a SL.

First Exemplary Embodiment of Communication Method Based on Uu DRX and SL DRX FIG. 7 is a conceptual diagram illustrating a first exemplary embodiment of a communication system including a Uu link and a SL.

As shown in FIG. 7, a communication system may include a base station, terminal #1, and terminal #2. A Uu link may be established between the base station and the terminal #1, and a SL may be established between the terminal #1 and the terminal #2. The terminal #1 may operate as a receiving terminal on the Uu link and may operate as a transmitting terminal on the SL. The terminal #2 may operate as a receiving terminal on the SL. Each of the terminal #1 and the terminal #2 may be a terminal located in a vehicle (e.g., vehicle (V)-UE).

The communication system may support a mode 1 (e.g., resource allocation (RA) mode 1). The mode 1 may be the sidelink TM #1 or #3 defined in Table 2. In this case, the base station may transmit configuration information for SL communication (hereinafter referred to as 'SL configuration information') through the Uu link. The terminal #1 may perform a DRX operation on the Uu link. The DRX operation performed on the Uu link may be referred to as 'Uu DRX operation'. The operation of transmitting the SL configuration information may be performed in consideration of the Uu DRX operation. That is, the operation of transmitting the SL configuration information may be restricted by the Uu DRX operation.

The terminal #2 may perform a DRX operation on the SL. The DRX operation performed on the SL may be referred to as 'SL DRX operation'. When the Uu DRX operation and the SL DRX operation are performed independently, the number of times the terminal #1 wakes up for a transmission/reception operation and/or the number of times the terminal #2 wakes up for a reception operation may increase. Accordingly, power consumption in the terminal(s) may increase, and a delay may increase due to operations according to DRX cycles. Therefore, methods for interworking of DRX operations on the Uu link and the SL are needed.

TABLE 3

| | Uu DRX state | SL DRX state | Operation mode of terminal #1 Uu link | Operation mode of terminal #1 SL | Operation mode of terminal #2 |
|---|---|---|---|---|---|
| DRX state #1 | OFF | OFF | Active | Active | Active |
| DRX state #2 | ON | ON | Active | Idle | Idle |
| DRX state #3 | ON | OFF | Idle | Active | Active |
| DRX state #4 | ON | ON | Idle | Idle | Idle |

The DRX state table defined in Table 3 may be configured by the base station and/or terminal #1. The DRX state table may define one or more DRX states. The DRX state may indicate a combination of a Uu DRX state and a SL DRX state. The base station may configure the DRX state table, and configure (e.g., signal) configuration information of the DRX state table to the terminal #1 and/or terminal #2. Together with or independently of the above-described operation, the terminal #1 may signal (e.g., transmit) the configuration information of the DRX state table received from the base station to the terminal #2. Alternatively, the terminal #1 may configure a DRX state table and configure (e.g., signal) configuration information of the DRX state table to the base station and/or the terminal #2. The communication nodes (e.g., base station, terminal #1, terminal #2) may perform communication in consideration of one or more DRX states defined in the DRX state table.

When the DRX state table defining a plurality of DRX states is configured, the base station and/or the terminal #1 may signal (e.g., transmit) information indicating use of one DRX state among the plurality of DRX states defined in the DRX state table. In this case, the communication nodes (e.g., base station, terminal #1, terminal #2) may perform communication in consideration of the one DRX state indicated by the base station and/or terminal #1. In addition, the information indicating the use of one DRX state and information on an effective period in which the one DRX state is used may be signaled (e.g., transmitted). In this case, the DRX state indicated by the base station and/or terminal #1 may be used within the effective period. When the effective period ends, the corresponding DRX state may not be used.

In exemplary embodiments, a Uu DRX state 'ON' may indicate that a DRX operation is performed on the Uu link, and a Uu DRX state 'OFF' may indicate that a DRX operation is not performed on the Uu link. When a Uu DRX state is 'OFF', the terminal #1 may operate in the active mode on the Uu link. A SL DRX state 'ON' may indicate that a DRX operation is performed on the SL, and a SL DRX state 'OFF' may indicate that a DRX operation is not performed on the SL. When the SL DRX state is 'OFF', each of the terminal #1 and the terminal #2 may operate in the active mode on the SL.

In the case of DRX state #1, DRX operations may not be performed on the Uu link and the SL. In this case, operation modes of all terminals (e.g., terminals #1 and #2) may be the active mode.

In the case of DRX state #2, a DRX operation may not be performed on the Uu link, and a DRX operation may be performed on the SL. In this case, the terminal #1 may operate in the active mode on the Uu link, and operate in the idle mode on the SL. In addition, the terminal #2 may enter the idle mode and perform a DRX operation on the SL. When there is data to be transmitted through the SL in the DRX state #2, the terminal #1 may wake up, and transmit the corresponding data to the terminal #2 in a reception period of the terminal #2, which is identified based on SL DRX configuration information (e.g., SL DRX cycle). The reception period of the terminal #2 may be a time during which the terminal #2 performs a reception operation on the SL. In the case of DRX state #2, the terminal #1 may operate in the active mode on the Uu link. Accordingly, it may be impossible for the terminal #1 to operate in the idle mode according to the SL DRX cycle.

In the case of DRX state #3, a DRX operation may be performed on the Uu link, and a DRX operation may not be performed on the SL. In this case, the terminal #1 may operate in the idle mode on the Uu link, perform a DRX operation on the Uu link, and operate in the active mode on the SL. In addition, the terminal #2 may operate in the active mode on the SL. In the case of DRX state #3, since the terminal #1 operates in the active mode on the SL, it may be impossible for the operation mode of the terminal #1 to transition to the idle mode according to the Uu DRX cycle.

In the case of DRX state #4, DRX operations may be performed on the Uu link and the SL. In this case, the terminal #1 may operate in the idle mode on the Uu link and the SL, and the terminal #2 may operate in the idle mode on the SL.

In the case of DRX states #1 and #2, since communication is performed on the Uu link without the Uu DRX operation, the operation of transmitting SL resource allocation information according to the mode 1 by the base station to the terminal #1 may not be restricted. Accordingly, SL communication between the terminal #1 and the terminal #2 may be performed without restrictions. In the case of DRX states #3 and #4, since communication is performed based on the Uu DRX operation on the Uu link, the base station may transmit SL resource allocation information according to the mode 1 to the terminal #1 in consideration of the Uu DRX cycle. Therefore, SL communication between the terminal #1 and the terminal #2 may be restricted by the Uu DRX operation.

Method #1

In the case of DRX states #3 and #4, the terminal #1 may maintain the idle mode on the Uu link. Uu DRX configuration information (e.g., Uu DRX cycle) may be configured in consideration of SL communication (e.g., SL DRX operation) between the terminal #1 and the terminal #2. The base station may transmit a paging message or a wake-up signal to the terminal #1 in a transmittable period according to the Uu DRX cycle. The paging message (or wake-up signal) may include information necessary for SL communication (hereinafter, referred to as 'SL configuration information'). The SL configuration information may include SL resource allocation information and/or SL DRX configuration information. The SL configuration information may be transmitted through a new channel defined in the Uu link, physical downlink control channel (PDCCH), physical downlink shared channel (PDSCH), or MAC CE. The terminal #1 may obtain the SL configuration information by receiving the paging message (or wake-up signal) from the base station, and may signal (e.g., configure) the corresponding SL configuration information to the terminal #2. The SL communication between the terminal #1 and the terminal #2 may be performed based on the SL configuration information.

In the case of DRX state #3, since the terminal #2 operates in the active mode on the SL, the operation of transmitting SL configuration information by the base station to the terminal #1 may occur frequently. To support this operation, the Uu DRX cycle may be set relatively short. In the case of DRX state #4, since the terminal #2 operates in the idle mode on the SL, the operation of transmitting SL configuration information by the base station to the terminal #1 may occur infrequently. To support this operation, the Uu DRX cycle may be set relatively long. That is, the length of the Uu DRX cycle may be set in consideration of the SL DRX state (e.g., the operation mode of the terminal #2). For example, the length of the Uu DRX cycle may be set as shown in Table 4 below.

TABLE 4

| SL DRX state | Length of Uu DRX cycle |
|---|---|
| OFF | First length |
| ON | Second length |

The base station and/or the terminal #1 may determine the length of the Uu DRX cycle in consideration of the SL DRX state. When the SL DRX state is 'OFF', a Uu DRX cycle having a first length (hereinafter referred to as 'Uu DRX cycle #1') may be set. When the SL DRX state is 'ON', a Uu DRX cycle having a second length (hereinafter referred to as 'Uu DRX cycle #2') may be set. The first length (e.g., Uu DRX cycle #1) may be shorter than the second length (e.g., Uu DRX cycle #2). The Uu DRX cycle may be set based on a resource pool (RP)-specific scheme, a cell-specific scheme, or a UE-specific scheme.

When the length of the Uu DRX cycle is determined by the base station, the base station may configure (e.g., signal) Uu DRX configuration information including information on the Uu DRX cycle to the terminal #1. When the length of the Uu DRX cycle is determined by the terminal #1, the terminal #1 may configure (e.g., signal) Uu DRX configuration information including information on the Uu DRX cycle to the base station. In addition, the terminal #1 may configure (e.g., signal) the above-described Uu DRX configuration information to the terminal #2. The base station and/or terminal #1 may operate according to the Uu DRX cycle in consideration of the SL DRX state. In the DRX state #3, the base station and/or terminal #1 may operate according to the Uu DRX cycle #1. In the DRX state #4, the base station and/or terminal #1 may operate according to the Uu DRX cycle #2.

In addition to the Uu DRX cycle, the terminal #1 may determine Uu DRX configuration parameter(s) in consideration of SL communication with the terminal #2, and may signal the Uu DRX configuration parameter(s) to the base station. When it is necessary to change the SL DRX configuration or when the SL DRX configuration is changed, the terminal #1 may configure (e.g., signal) the changed SL DRX configuration information to the terminal #2.

Method #2

In the case of DRX states #3 and #4, the terminal #1 may maintain the idle mode on the Uu link. The Uu DRX configuration may be maintained, and a SL communication scheme (e.g., SL configuration information) may be configured according to the DRX state. The base station may transmit a paging message or a wake-up signal to the terminal #1 in a transmittable period according to the Uu DRX cycle. The paging message (or wake-up signal) may include SL configuration information. The SL configuration information may be transmitted through a new channel defined in the Uu link, PDCCH, PDSCH, or MAC CE. The terminal #1 may obtain the SL configuration information by receiving the paging message (or wake-up signal) from the base station, and may signal (e.g., configure) the SL configuration information to the terminal #2. SL communication between the terminal #1 and the terminal #2 may be performed based on the SL configuration information.

Referring to Table 5 below, the number of SL resources reserved by one SCI (or the number of reservable SL resources) may be set based on a type of the Uu DRX cycle and the SL DRX state. In exemplary embodiments, 'reservation' may mean 'allocation' or 'configuration'. A long cycle may mean a Uu DRX cycle having a relatively long length. A short cycle may mean a Uu DRX cycle having a relatively short length. Each of a long cycle and a short cycle may be mapped to a specific value (e.g., specific length). Alternatively, along cycle may mean along cycle range, and a short cycle may mean a short cycle range. When the type of the Uu DRX cycle is a long cycle, the Uu DRX cycle may be determined within the long cycle range. When the type of the Uu DRX cycle is a short cycle, the Uu DRX cycle may be determined within the short cycle range. The Uu DRX cycle may be defined in three or more types.

TABLE 5

| Type of Uu DRX cycle | SL DRX state | The number of SL resources reserved by one SCI |
|---|---|---|
| Long cycle | ON | 2 |
| | OFF | $N_{max}$ |
| Short cycle | ON | 1 |
| | OFF | $N_{max}/2$ |

When the type of the Uu DRX cycle is a long cycle, the operation of transmitting SL configuration information by the base station to the terminal #1 may be performed according to a long periodicity. When the SL DRX state is 'ON', sidelink transmission from the terminal #1 to the terminal #2 may not occur frequently. Accordingly, the number of SL resources reserved by one SCI may be set small. For example, the number of SL resources reserved by one SCI may be 2. That is, when the SL DRX state is 'ON', the number of SL resources reserved by one SCI may be less than the maximum number. When the SL DRX state is 'OFF', sidelink transmission from the terminal #1 to the terminal #2 may occur frequently. Accordingly, the number of SL resources reserved by one SCI may be set to the maximum number (e.g., $N_{max}$). $N_{max}$ may be a natural number. The SL resources may be configured in units of symbols, mini-slots, slots, subframes, subcarriers, subbands, and/or physical resource blocks (PRBs). For example, the SL resource may be a resource region composed of p symbols and i subcarriers. Each of p and i may be a natural number.

When the type of the Uu DRX cycle is a short cycle, the operation of transmitting SL configuration information by the base station to the terminal #1 may be performed according to a short periodicity. When the SL DRX state is 'ON', sidelink transmission from the terminal #1 to the terminal #2 may not occur frequently. Accordingly, the number of SL resources reserved by one SCI may be set small. For example, the number of SL resources reserved by one SCI may be 1. When the SL DRX state is 'OFF', sidelink transmission from the terminal #1 to the terminal #2 may occur frequently. Accordingly, the number of SL resources reserved by one SCI may be set to the maximum number/2 (e.g., $N_{max}/2$). Since the operation of transmitting SL configuration information by the base station to the terminal #1 is performed according to a short periodicity, even when sidelink transmission from the terminal #1 to the terminal #2 occurs frequently, the number of SL resources reserved by one SCI may be set smaller than the maximum number (e.g. $N_{max}$). The number of SL resources reserved by one SCI when the SL DRX state is 'ON' may be set smaller than the number of SL resources reserved by one SCI when the SL DRX state is 'OFF'.

The base station and/or terminal #1 may determine the type of the Uu DRX cycle. The base station may configure (e.g., signal) information on the type of the Uu DRX cycle to the terminal #1 and/or terminal #2. Together with or independently of the above-described operation, the terminal #1 may configure (e.g., signal) information on the type of the Uu DRX cycle to the terminal #2. The terminal #1 and/or terminal #2 may determine the number of SL resources reserved by one SCI based on the type of the Uu DRX cycle and the SL DRX state. SL communication between the terminal #1 and terminal #2 may be performed using SL resource(s) reserved by SCI. The above-described operation may be performed based on Table 5 preconfigured in the communication nodes (e.g., base station, terminal #1, and/or terminal #2).

The exemplary embodiments based on Table 5 may be performed by the base station knowing the SL DRX state. To support this operation, the terminal #1 may report SL DRX state information to the base station through the Uu link. The SL DRX state information may be transmitted using at least one of a PUCCH, PUSCH, or MAC CE.

Method #3

As in the communication system shown in FIG. 7, when a SL is established between the terminal #1 and the terminal #2, the terminal #1 may always be prohibited from performing a SL DRX operation (e.g., entering the idle mode). In this case, regardless of whether a SL DRX operation is performed, the terminal #1 may continuously receive SL configuration information from the base station, and may perform SL communication with the terminal #2 based on the SL configuration information. Even when a triggering condition for the terminal #1 to perform a Uu DRX operation (e.g., enter the idle mode) is satisfied, in order to recognize that the terminal #1 does not perform a Uu DRX operation (e.g., does not enter the idle mode) for SL communication, the base station may need to know that SL communication is currently being performed. Since the base station communicates with the terminal #1 based on the mode 1, the base station may know whether the terminal #1 is performing SL communication. Alternatively, the terminal #1 may report information indicating whether a SL DRX operation is being performed to the base station. The information indicating whether a SL DRX operation is being performed may be transmitted using at least one of a PUCCH, PUSCH, or MAC CE.

As an exception situation for the triggering condition described above, the terminal #1 performing SL communication may be prohibited from performing a SL DRX operation (e.g., entering the idle mode). The above-mentioned exceptional situation may be configured to the communication node (e.g., base station, terminal #1, and/or terminal #2). Only when SL communication between the terminal #1 and the terminal #2 is being performed, the terminal #1 may be prohibited from performing a SL DRX operation (e.g., entering the idle mode). When the above-described triggering condition is satisfied, the terminal #1 may perform a SL DRX operation after entering the idle mode.

When information indicating that SL communication is performed is not received from the terminal #1 during a preset time period, the base station may determine that a SL DRX operation is being performed and may perform communication according to the Uu DRX operation. Here, the Uu DRX operation may be performed when the SL DRX operations are performed on all the SLs. The information indicating that SL communication is performed may be transmitted using at least one of report information, scheduling request (SR), or buffer status report (BSR) which is received from the terminal #1.

The communication system may support the mode 1 (e.g., RA mode 1). In this case, the base station may transmit SL configuration information through the Uu link. The terminal #1 may perform a DRX operation on the Uu link. The operation of transmitting the SL configuration information may be performed in consideration of the Uu DRX operation. That is, the operation of transmitting the SL configuration information may be restricted by the Uu DRX operation.

The terminal #2 may perform a DRX operation on the SL #1, and the terminal #3 may perform a DRX operation on the SL #2. When the Uu DRX operation and the SL DRX operation are performed independently, the number of times the terminal #1 wakes up for a transmission/reception operation, the number of times the terminal #2 wakes up for a reception operation, and/or the number of times the terminal #3 wakes up for a reception operation may be increased. Accordingly, power consumption in the terminal(s) may increase, and a delay may increase due to operations according to DRX cycles. Therefore, methods for interworking of the DRX operations on the Uu link and the SL are needed.

TABLE 6

| | Uu DRX state | SL DRX state #1 (SL #1) | SL DRX state #2 (SL #2) | Operation mode of terminal #1 Uu link | SL #1 | SL #2 | Operation mode of terminal #2 | Operation mode of terminal #3 |
|---|---|---|---|---|---|---|---|---|
| DRX state #1 | OFF | OFF | OFF | Active | Active | Active | Active | Active |
| DRX state #2 | OFF | OFF | ON | Active | Active | Idle | Active | Idle |
| DRX state #3 | OFF | ON | OFF | Active | Idle | Active | Idle | Active |
| DRX state #4 | OFF | ON | ON | Active | Idle | Idle | Idle | Idle |
| DRX state #5 | ON | OFF | OFF | Idle | Active | Active | Active | Active |
| DRX state #6 | ON | OFF | IB | Idle | Active | Idle | Active | Idle |
| DRX state #7 | ON | ON | OFF | Idle | Idle | Active | Idle | Active |
| DRX state #8 | ON | ON | ON | Idle | Idle | Idle | Idle | Idle |

Second Exemplary Embodiment of Communication Method Based on Uu DRX and SL DRX

Figure 8:
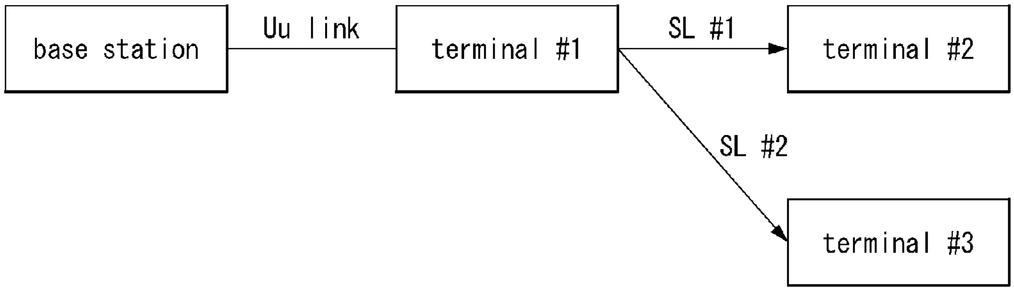
FIG. 8 is a conceptual diagram illustrating a second exemplary embodiment of a communication system including a Uu link and a SL.

FIG. 8 is a conceptual diagram illustrating a second exemplary embodiment of a communication system including a Uu link and a SL.

As shown in FIG. 8, a communication system may include a base station, terminal #1, terminal #2, and terminal #3. A Uu link may be established between the base station and the terminal #1, a SL may be established between the terminal #1 and the terminal #2, and a SL may be established between the terminal #1 and the terminal #3. The terminal #1 may operate as a receiving terminal on the Uu link and may operate as a transmitting terminal on each of the SL #1 and SL #2. The terminal #2 may operate as a receiving terminal on the SL #1, and the terminal #3 may operate as a receiving terminal on the SL #2. Each of the terminal #1, terminal #2, and terminal #3 may be a terminal located in a vehicle (e.g., V-UE).

The DRX state table defined in Table 6 may be configured by the base station and/or terminal #1. The DRX state table may define one or more DRX states. The DRX state may be a combination of a Uu DRX state, SL DRX state #1, and SL DRX state #2. The base station may configure the DRX state table, and configure (e.g., signal) configuration information of the DRX state table to the terminal #1, terminal #2, and/or terminal #3. Together with or independently of the above-described operation, the terminal #1 may signal (e.g., transmit) the configuration information of the DRX state table received from the base station to the terminal #2 and/or terminal #3. Alternatively, the terminal #1 may configure a DRX state table and configure (e.g., signal) configuration information of the DRX state table to the base station, terminal #2, and/or terminal #3. The communication nodes (e.g., base station, terminal #1, terminal #2, terminal #3) may perform communication in consideration of one or more DRX states defined in the DRX state table.

When the DRX state table defining a plurality of DRX states is configured, the base station and/or terminal #1 may signal (e.g., transmit) information indicating use of one DRX state among the plurality of DRX states defined in the DRX state table. In this case, the communication nodes (e.g., base station, terminal #1, terminal #2, terminal #3) may perform communication in consideration of the one DRX state indicated by the base station and/or terminal #1.

In exemplary embodiments, a Uu DRX state ‘ON’ may indicate that a DRX operation is performed on the Uu link, and a Uu DRX state ‘OFF’ may indicate that a DRX operation is not performed on the Uu link. A SL DRX state ‘ON’ may indicate that a DRX operation is performed on the SL, and a SL DRX state ‘OFF’ may indicate that a DRX operation is not performed on the SL.

In the case of DRX state #1, all terminals (e.g., terminal #1, terminal #2, and terminal #3) may operate in the active mode. That is, since the DRX operation is not performed on the Uu link, SL #1, and SL #2, the Uu DRX state, SL DRX state #1, and SL DRX state #2 may all be ‘OFF’.

In the case of DRX state #2, each of the terminal #1 and terminal #3 may operate in the idle mode on the SL #2. That is, since the DRX operation is performed on the SL #2, the SL DRX state #2 may be ‘ON’. The terminal #1 may operate in the active mode on each of the Uu link and SL #1. That is, the Uu DRX state and the SL DRX state #1 may be ‘OFF’.

In the case of DRX states #1 to #4, since communication is performed on the Uu link without a Uu DRX operation, an operation of transmitting SL resource allocation information according to the mode 1 by the base station to the terminal #1 may not be restricted. Accordingly, SL communication between the terminal #1 and terminal #2 and SL communication between the terminal #1 and terminal #3 may be performed without restrictions. In the case of DRX states #5 to #8, since communication is performed based on the Uu DRX operation on the Uu link, the base station may transmit SL resource allocation information according to the mode 1 to the terminal #1 in consideration of the Uu DRX cycle. Therefore, the SL communication between the terminal #1 and terminal #2 and the SL communication between the terminal #1 and terminal #3 may be restricted by the Uu DRX operation.

Method #1

In the case of DRX states #5 to #8, the terminal #1 may maintain the idle mode on the Uu link. Uu DRX configuration information (e.g., Uu DRX cycle) may be configured in consideration of SL communication between the terminal #1 and the terminal #2 and/or SL communication between the terminal #1 and the terminal #3. The base station may transmit a paging message or a wake-up signal to the terminal #1 in a transmittable period according to the Uu DRX cycle. The paging message (or wake-up signal) may include SL configuration information. The SL configuration information may include SL resource allocation information and/or SL DRX configuration information. The SL configuration information may be transmitted through a new channel defined in the Uu link, PDCCH, PDSCH, or MAC CE. The terminal #1 may obtain the SL configuration information by receiving the paging message (or wake-up signal) from the base station, and may signal (e.g., configure) the corresponding SL configuration information to the terminal #2 and/or terminal #3. The SL communication between the terminal #1 and the terminal #2 and the SL communication between the terminal #1 and the terminal #3 may be performed based on the SL configuration information.

In the case of DRX state #5, #6, or #7, since at least one of the terminal #2 and terminal #3 operates in the active mode on the SL, the operation of transmitting SL configuration information by the base station to the terminal #1 may occur frequently. To support this operation, the Uu DRX cycle may be set relatively short. In the case of DRX state #8, since the terminals #2 and #3 operate in the idle mode on the SL, the operation of transmitting SL configuration information by the base station to the terminal #1 may occur infrequently. To support this operation, the Uu DRX cycle may be set relatively long. That is, the length of the Uu DRX cycle may be set in consideration of the SL DRX state #1 and/or #2 (e.g., the operation mode of the terminal #2 and/or terminal #3). For example, the length of the Uu DRX cycle may be set as shown in Table 7 below.

TABLE 7

| SL DRX state #1 | SL DRX state #2 | Length of Uu DRX cycle |
|---|---|---|
| OFF | OFF | First length |
| ON | OFF | First length |
| OFF | ON | First length |
| ON | ON | Second length |

The base station and/or the terminal #1 may determine the length of the Uu DRX cycle in consideration of the SL DRX state #1 and/or SL DRX state #2. When at least one of the SL DRX states #1 and #2 is ‘OFF’, a Uu DRX cycle having a first length (hereinafter referred to as ‘Uu DRX cycle #1’) may be set. When the SL DRX states #1 and #2 are ‘ON’, a Uu DRX cycle having a second length (hereinafter referred to as ‘Uu DRX cycle #2’) may be set. The first length (e.g., Uu DRX cycle #1) may be shorter than the second length (e.g., Uu DRX cycle #2). The Uu DRX cycle may be set based on an RP-specific scheme, a cell-specific scheme, or a UE-specific scheme.

When the length of the Uu DRX cycle is determined by the base station, the base station may configure (e.g., signal) Uu DRX configuration information including information on the Uu DRX cycle to the terminal #1. When the length of the Uu DRX cycle is determined by the terminal #1, the terminal #1 may configure (e.g., signal) Uu DRX configuration information including information on the Uu DRX cycle to the base station. In addition, the terminal #1 may configure (e.g., signal) the above-described Uu DRX configuration information to the terminal #2 and/or terminal #3. The base station and/or terminal #1 may operate according to the Uu DRX cycle in consideration of the SL DRX state. In the DRX states #5, #6, and #7, the base station and/or terminal #1 may operate according to the Uu DRX cycle #1. In the DRX state #8, the base station and/or terminal #1 may operate according to the Uu DRX cycle #2.

In addition to the Uu DRX cycle, the terminal #1 may determine Uu DRX configuration parameter(s) in consideration of SL communication with the terminal #2 and/or terminal #3, and may signal the Uu DRX configuration parameter(s) to the base station. When it is necessary to change the SL DRX configuration or when the SL DRX configuration is changed, the terminal #1 may configure (e.g., signal) the changed SL DRX configuration information to the terminal #2 and/or terminal #3.

The terminal #1 may set a Uu DRX cycle having a relatively long length when DRX operations are performed on all the SLs. When the DRX operation is not performed in one or more SLs among all the SLs, the terminal #1 may set a Uu DRX cycle having a relatively short length.

Method #2

In the case of DRX states #5 to #8, the terminal #1 may maintain the idle mode on the Uu link. The Uu DRX configuration may be maintained, and a SL communication scheme (e.g., SL configuration information) may be configured according to the DRX state. The base station may transmit a paging message or a wake-up signal to the terminal #1 in a transmittable period according to the Uu DRX cycle. The paging message (or wake-up signal) may include SL configuration information. The SL configuration information may be transmitted through a new channel defined in the Uu link, PDCCH, PDSCH, or MAC CE. The terminal #1 may obtain the SL configuration information by receiving the paging message (or wake-up signal) from the base station, and may signal (e.g., configure) the SL configuration information to the terminal #2. SL communication between the terminal #1 and the terminal #2 may be performed based on the SL configuration information.

Referring to Table 8 below, the number of SL resources reserved by one SCI (or the number of reservable SL resources) may be set based on a type of the Uu DRX cycle, the SL DRX state #1, and the SL DRX state #2. A long cycle may mean a Uu DRX cycle having a relatively long length. A short cycle may mean a Uu DRX cycle having a relatively short length. Each of a long cycle and a short cycle may be mapped to a specific value (e.g., specific length). Alternatively, a long cycle may mean a long cycle range, and a short cycle may mean a short cycle range. When the type of the Uu DRX cycle is a long cycle, the Uu DRX cycle may be determined within the long cycle range. When the type of the Uu DRX cycle is a short cycle, the Uu DRX cycle may be determined within the short cycle range. The Uu DRX cycle may be defined in three or more types.

TABLE 8

| Type of Uu DRX cycle | SL DRX state #1 | SL DRX state #2 | The number of SL resources reserved by one SCI |
|---|---|---|---|
| Long cycle | ON | ON | 2 |
| | OFF | ON | $N_{max}$ |
| | ON | OFF | $N_{max}$ |
| | OFF | OFF | $N_{max}$ |
| Short cycle | ON | ON | 1 |
| | OFF | ON | $N_{max}/2$ |
| | ON | OFF | $N_{max}/2$ |
| | OFF | OFF | $N_{max}/2$ |

When the type of the Uu DRX cycle is a long cycle, the operation of transmitting SL configuration information by the base station to the terminal #1 may be performed according to a long periodicity. When the SL DRX states #1 and #2 are 'ON', sidelink transmission from the terminal #1 to the terminal #2 and sidelink transmission from the terminal #1 to the terminal #3 may not occur frequently. Accordingly, the number of SL resources reserved by one SCI may be set small. For example, the number of SL resources reserved by one SCI may be 2. When one or more SL DRX states among the SL DRX states #1 and #2 are 'OFF', sidelink transmission from the terminal #1 to the terminal #2 and/or sidelink transmission from the terminal #1 to the terminal #3 may occur frequently. Accordingly, the number of SL resources reserved by one SCI may be set to the maximum number (e.g., $N_{max}$). $N_{max}$ may be a natural number. The SL resources may be configured in units of symbols, mini-slots, slots, subframes, subcarriers, subbands, and/or PRBs. For example, the SL resource may be a resource region composed of p symbols and i subcarriers. Each of p and i may be a natural number.

When the type of the Uu DRX cycle is a short cycle, the operation of transmitting SL configuration information by the base station to the terminal #1 may be performed according to a short periodicity. When the SL DRX states #1 and #2 are 'ON', sidelink transmission from the terminal #1 to the terminal #2 and sidelink transmission from the terminal #1 to the terminal #3 may not occur frequently. Accordingly, the number of SL resources reserved by one SCI may be set small. For example, the number of SL resources reserved by one SCI may be 1. When one or more SL DRX states among the SL DRX states #1 and #2 are 'OFF', sidelink transmission from the terminal #1 to the terminal #2 and/or sidelink transmission from the terminal #1 to the terminal #3 may occur frequently. Accordingly, the number of SL resources reserved by one SCI may be set to the maximum number/2 (e.g., $N_{max}/2$). Since the operation of transmitting SL configuration information by the base station to the terminal #1 is performed according to a short periodicity, even when sidelink transmission from the terminal #1 to the terminal #2 and/or sidelink transmission from the terminal #1 to the terminal #3 occurs frequently, the number of SL resources reserved by one SCI may be set smaller than the maximum number (e.g. $N_{max}$).

The base station and/or terminal #1 may determine the type of the Uu DRX cycle. The base station may configure (e.g., signal) information on the type of the Uu DRX cycle to the terminal #1, terminal #2, and/or terminal #3. Together with or independently of the above-described operation, the terminal #1 may configure (e.g., signal) information on the type of the Uu DRX cycle to the terminal #2 and/or terminal #3. The terminal #1, terminal #2, and/or terminal #3 may determine the number of SL resources reserved by one SCI based on the type of the Uu DRX cycle, the SL DRX state #1, and the SL DRX state #2. SL communication between the terminal #1 and terminal #2 and/or SL communication between the terminal #1 and terminal #3 may be performed using SL resource(s) reserved by SCI. The above-described operation may be performed based on Table 8 preconfigured in the communication nodes (e.g., base station, terminal #1, terminal #2, and/or terminal #3).

The exemplary embodiments based on Table 8 may be performed by the base station knowing the SL DRX state. To support this operation, the terminal #1 may report SL DRX state information to the base station through the Uu link. The SL DRX state information may be transmitted using at least one of a PUCCH, PUSCH, or MAC CE.

Method #3

As in the communication system shown in FIG. 8, when SLs are established in the terminal #1, the terminal #1 may always be prohibited from performing a SL DRX operation (e.g., entering the idle mode). In this case, regardless of whether a SL DRX operation is performed, the terminal #1 may continuously receive SL configuration information from the base station, and may perform SL communication with the terminal #2 and/or terminal #3 based on the SL configuration information. Even when a triggering condition for the terminal #1 to perform a Uu DRX operation (e.g., enter the idle mode) is satisfied, in order to recognize that the terminal #1 does not perform a Uu DRX operation (e.g., does not enter the idle mode) for SL communication, the base station may need to know that SL communication is currently being performed. Since the base station communicates with the terminal #1 based on the mode 1, the base station may know whether the terminal #1 is performing SL communication.

When the terminal #1 performs one or more SL communications, the terminal #1 may be prohibited from performing a SL DRX operation (e.g., entering the idle mode). When the SL DRX operations are performed on all SLs, the terminal #1 may perform the SL DRX operations after entering the idle mode according to the triggering condition. Even when the triggering condition for the terminal #1 to perform a Uu DRX operation (e.g., enter the idle mode) is satisfied, in order to recognize that the terminal #1 does not perform a Uu DRX operation (e.g., does not enter the idle mode) for SL communication, the base station may need to know that SL communication is currently being performed. The terminal #1 may report information indicating whether a SL DRX operation is being performed to the base station. The information indicating whether a SL DRX operation is being performed may be transmitted using at least one of a PUCCH, PUSCH, or MAC CE.

When information indicating that SL communication is performed is not received from the terminal #1 during a preset time period, the base station may determine that a SL DRX operation is being performed and may perform communication according to the Uu DRX operation. The information indicating that SL communication is performed may be transmitted using at least one of report information, SR, or BSR which is received from the terminal #1.

The above-described exemplary embodiments may also be applied to a communication environment in which the terminal #1 performs SL communications with three or more terminals. The Uu DRX operation may be performed when the SL DRX operation is performed in one or more SLs among all SLs supported by the terminal #1.

The exemplary embodiments of the present disclosure may be implemented as program instructions executable by a variety of computers and recorded on a computer readable medium. The computer readable medium may include a program instruction, a data file, a data structure, or a combination thereof. The program instructions recorded on the computer readable medium may be designed and configured specifically for the present disclosure or can be publicly known and available to those who are skilled in the field of computer software.

Examples of the computer readable medium may include a hardware device such as ROM, RAM, and flash memory, which are specifically configured to store and execute the program instructions. Examples of the program instructions include machine codes made by, for example, a compiler, as well as high-level language codes executable by a computer, using an interpreter. The above exemplary hardware device can be configured to operate as at least one software module in order to perform the embodiments of the present disclosure, and vice versa.

While the exemplary embodiments of the present disclosure and their advantages have been described in detail, it should be understood that various changes, substitutions and alterations may be made herein without departing from the scope of the present disclosure.

What is claimed is:

1. A method of a first user equipment (UE), the method comprising:

receiving, from a base station, Uu discontinuous reception (DRX) configuration information for a Uu link between the base station and the first UE and first sidelink (SL) DRX configuration information for a first SL between the first UE and a second UE; receiving, from the base station, DRX state information indicating a Uu DRX state on the Uu link between the base station and the first UE and a first sidelink (SL) SL DRX state on the first SL between the first UE and a second UE;

performing communication with the base station on the Uu link based on the Uu DRX state indicated by the DRX state information and the Uu DRX configuration information; and performing communication with the second UE on the first SL based on the first SL DRX state indicated by the DRX state information and the first SL DRX configuration information, wherein the Uu DRX state indicates whether a Uu DRX operation is performed, the first SL DRX state indicates whether a first SL DRX operation is performed, and a length of a Uu DRX cycle associated with the Uu DRX operation on the Uu link is set differently based on the first SL DRX state.

2. The method according to claim 1, wherein the DRX state information further indicates a second SL DRX state indicating whether a second SL DRX operation is performed on a second SL between the first UE and a third UE, and communication between the first UE and the third UE is performed based on the second SL DRX state.

3. The method according to claim 1, wherein when the first SL DRX state indicates that the first SL DRX operation is not performed, the Uu DRX cycle having a first length is set, and when the first SL DRX state indicates that the first SL DRX operation is performed, the Uu DRX cycle having a second length is set, the first length being shorter than the second length.

4. The method according to claim 1, wherein the performing of the communication with the second UE comprises: determining a number of SL resources reserved by one sidelink control information (SCI) based on a type of a Uu DRX cycle associated with the Uu DRX operation and the first SL DRX state; and performing communication with the second UE using the SL resources reserved by the one SCI.

5. The method according to claim 4, wherein when the type of the Uu DRX cycle is a long cycle and the first SL DRX state indicates that the first SL DRX operation is not performed, the number of SL resources is determined to be a preset maximum number, and when the type of the Uu DRX cycle is the long cycle and the first SL DRX state indicates that the first SL DRX operation is performed, the number of SL resources is determined to be less than the preset maximum number.

6. The method according to claim 4, wherein when the type of the Uu DRX cycle is a short cycle and the first SL DRX state indicates that the first SL DRX operation is performed, the number of SL resources is determined to be smaller than a number of the SL resources determined when the type of the Uu DRX cycle is the short cycle and the first SL DRX state indicates that the first SL DRX operation is not performed.

7. The method according to claim 1, further comprising: receiving, from the base station, a DRX state table defining combinations of a plurality of Uu DRX states and a plurality of first SL DRX states, wherein the DRX state information indicates one combination among the combinations.

8. The method according to claim 7, further comprising: transmitting the DRX state table to the second UE; and transmitting the DRX state information indicating the one combination among the combinations defined in the DRX state table to the second UE.

9. The method according to claim 1, further comprising: receiving, from the base station, information of an effective period in which the DRX state information is used, wherein communication based on the DRX state information is performed within the effective period.

10. A first user equipment (UE), comprising: a processor; and a memory storing instructions executable by the processor to perform: receiving, from a base station, Uu discontinuous reception (DRX) configuration information for a Uu link between the base station and the first UE and first sidelink (SL) DRX configuration information for a first SL between the first UE and a second UE;

receiving, from the base station, DRX state information indicating a Uu DRX state on the Uu link between the base station and the first UE and a first sidelink (SL) SL DRX state on the first SL between the first UE and a second UE; performing communication with the base station on the Uu link based on the Uu DRX state indicated by the DRX state information and the Uu DRX configuration information; and performing communication with the second UE on the first SL based on the first SL DRX state indicated by the DRX state information and the first SL DRX configuration information, wherein the Uu DRX state indicates whether a Uu DRX operation is performed, the first SL DRX state indicates whether a first SL DRX operation is performed, and a length of a Uu DRX cycle associated with the Uu DRX operation on the Uu link is set differently based on the first SL DRX state.

11. The first UE according to claim 10, wherein the DRX state information further indicates a second SL DRX state indicating whether a second SL DRX operation is performed on a second SL between the first UE and a third UE, and communication between the first UE and the third UE is performed based on the second SL DRX state.

12. The first UE according to claim 10, wherein when the first SL DRX state indicates that the first SL DRX operation is not performed, the Uu DRX cycle having a first length is set, and when the first SL DRX state indicates that the first SL DRX operation is performed, the Uu DRX cycle having a second length is set, the first length being shorter than the second length.

13. The first UE according to claim 10, wherein the performing of the communication with the second UE comprises: determining a number of SL resources reserved by one sidelink control information (SCI) based on a type of a Uu DRX cycle associated with the Uu DRX operation and the first SL DRX state; and performing communication with the second UE using the SL resources reserved by the one SCI.

14. The first UE according to The first UE according to wherein when the type of the Uu DRX cycle is a long cycle and the first SL DRX state indicates that the first SL DRX operation is not performed, the number of SL resources is determined to be a preset maximum number, and when the type of the Uu DRX cycle is the long cycle and the first SL DRX state indicates that the first SL DRX operation is performed, the number of SL resources is determined to be less than the preset maximum number, and wherein when the type of the Uu DRX cycle is a short cycle and the first SL DRX state indicates that the first SL DRX operation is performed, the number of SL resources is determined to be smaller than a number of the SL resources determined when the type of the Uu DRX cycle is the short cycle and the first SL DRX state indicates that the first SL DRX operation is not performed.

15. The first UE according to claim 10, wherein the instructions are further executed to perform: receiving, from the base station, a DRX state table defining combinations of a plurality of Uu DRX states and a plurality of first SL DRX states, wherein the DRX state information indicates one combination among the combinations.

* * * * *